Patented July 19, 1932

1,868,057

UNITED STATES PATENT OFFICE

CHRISTIAN FLEISCH, OF SAARBRUCKEN, FRANCE

PROCESS FOR THE MANUFACTURE OF A PLASTIC WATERPROOFING MEDIUM MADE OF CALF'S TALLOW OR FAT AND LIME

No Drawing. Application filed February 13, 1931, Serial No. 515,651, and in Germany February 17, 1930.

According to a process that has become known for the manufacture of a waterproof addition to mortar, tallow and alcohol were used mixed together and the lime was previously slaked with hot water and then added thereto, but unfortunately the addition of alcohol according to this process deleteriously affected the binding properties of the product so obtained.

According to another process the lime was slaked wet and the tallow was then added during the heating up of the lime due to its slaking, the preparation was then dried and finally ground. This process however was awkward and complicated and the product was usually not uniform and consequently the practical success of this process was very doubtful.

According to a further process the lime was slaked with boiling water, thereupon the tallow was added and the product was marketed in a liquid state. The defect arising in this process was that several substances were washed out by the boiling water, and as these had to be replaced by additions the process was of course economically inefficient. Moreover the packing and transportation of the finished product in cans and barrels was awkward and also very expensive.

These disadvantages are eliminated by the process according to the present invention by first of all making every mortar forming substance such as lime, cement or gypsum water-proof, without however changing the structure or action or properties of the dry, ground or pulverized mortar material, or in any way deleteriously affecting it.

The additional material to the mortar, which is produced according to the new process, and is water proof, or at least inimical to the action of the water, has the further advantage, that it can be marketed in the same way, i. e. packed in its dry state, as the non-waterproof mortar material of the same kind.

It must be further pointed out that the new material is extremely simple and cheap to manufacture, and enables a delivery of a uniform quality product to be ensured, and consequently also a water proof mortar prepared with it of a uniform quality.

The new process is carried into effect in the following manner:

A definite quantity of lime in lumps, previously immersed in water for a short time is introduced in a pressure resisting and closeable drum. At the same time a suitable quantity of disintegrated calf's tallow (i. e. calf's suet in small pieces) is added to the lime in the drum, the drum is then closed and continuously rotated.

In this manner the lime in the drum is slaked in the manner known per se. By reason of the continued centrifugal action of the rotating drum and the slaking vapours evolved in the drum, and also by reason of the great amount of reaction heat evolved the tallow is caused to melt and is thus very intimately mixed and compounded with the individual lime particles, especially as the steam evolved during the reaction process produces a high pressure in the drum. For the purpose of avoiding any possible bursting of the drum due to the high pressure steam generated therein, it is provided with a suitable safety valve. The perfect and complete disintegration of the individual particles of the lime is thus fully ensured by the high pressure steam evolved in the lime slaking process.

The material thus dissolved and mixed is then passed over a rotary sieve for the purpose of eliminating any foreign matter or lumpy residual matter.

Then it is ready to be mixed with the lime, cement or gypsum to be waterproofed, very intimately, and the finished waterproofed product is then ready to be marketed in sacks, containers or the like.

I claim:

The herein described process of producing a plastic water proofing compound, consisting in confining water impregnated quicklime together with disintegrated tallow in a confining space hermetically sealed and thereby causing the lime to be slaked and the heat evolved during the reaction process to melt the tallow and the pressure also resulting to promote the mixing of the melted tallow and the individual lime particles and stirring the mass during the slaking of the lime and the maintenance of the pressure to cause complete disintegration of the lime particles and complete mixing of the melted tallow therewith.

In testimony whereof, I have hereunto set my hand, this 28th day of January, A. D. 1931.

CHRISTIAN FLEISCH.